April 4, 1961   W. L. SCHULTZ ET AL   2,978,017
BEAD BREAKER
Filed Feb. 17, 1959
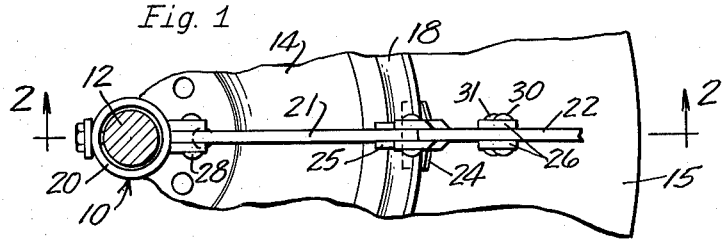
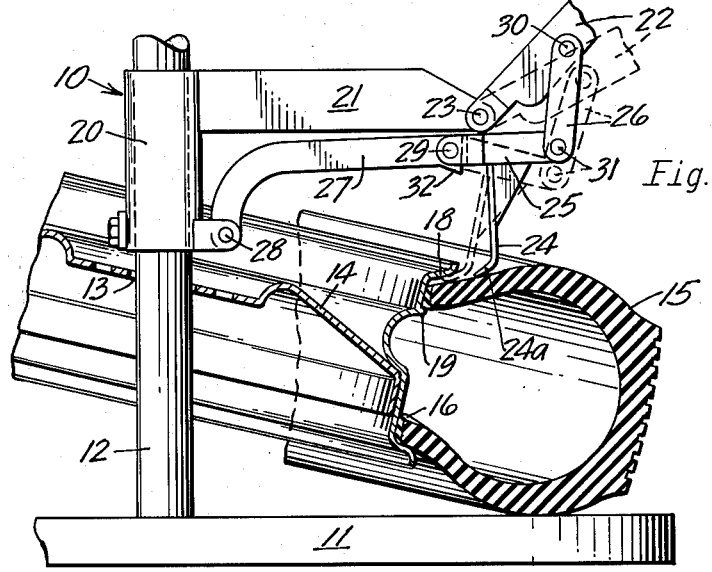
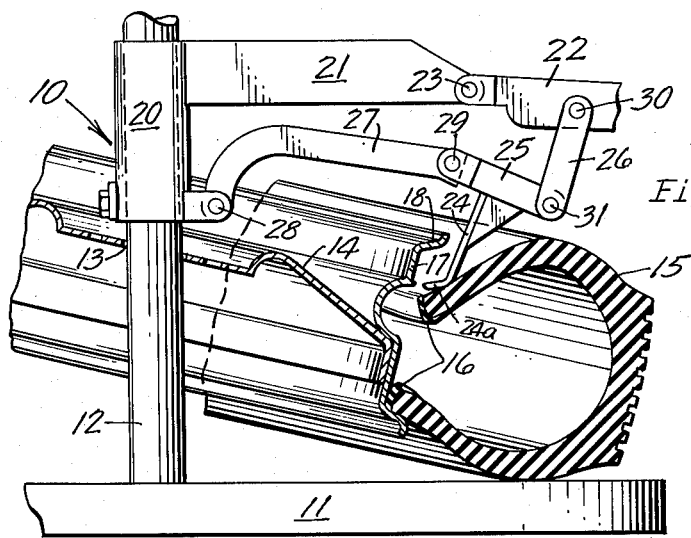
INVENTORS
WILLIAM L. SCHULTZ
BY MATTHEW J. SCHULTZ
Williamson, Schroeder & Palmatier
ATTORNEYS

2,978,017
BEAD BREAKER

William L. Schultz and Matthew J. Schultz, Red Lake Falls, Minn., assignors, by mesne assignments, to Red Lake County State Bank, Red Lake Falls, Minn., a corporation of Minnesota Filed Feb. 17, 1959, Ser. No. 793,749

2 Claims. (Cl. 157—1.26)

This invention relates to a method of and apparatus for breaking the bead of a tire away from the rim surface of a wheel.

It has been a problem in the recent past, with the development of improved wheel constructions to easily and quickly break the bead of a tire away from the rim surface without damaging the tire bead which is extremely important because of the tubeless construction of the tires and because of the necessity of maintaining an air sealing relation between the tire bead and the rim surface. It will be understood that the tire bead, in many tires, has a soft layer of rubber which is positioned to engage the rim surface and this softer rubber is subject to being damaged if the tire bead sticks tightly to the rim surface and is not properly loosened therefrom. Apparatus known heretofore has not provided for movement of the tire bead outwardly away from the rim surface and damaged beads have resulted. It should be recognized that in certain wheel constructions used in modern automobiles, a bead is provided on the rim surface at the innermost side of the tire bead so as to restrict inward movement of the tire bead along the rim surface. Removal of the tire from a rim surface with such a bead necessitates pulling the tire bead away from the rim surface in a radial direction (relative to the center of the wheel).

It is not known that prior art devices have manipulated the tire bead in order to overcome these problems in removal of tires from wheels.

With these comments in mind, it is to the elimination of these and other disadvantages that the present invention is directed, along with the inclusion therein of other novel and desirable features.

An object of our invention is to provide a new and improved bead-breaking apparatus of simple and inexpensive construction and operation.

Another object of our invention is to provide a novel and improved apparatus for breaking the bead of a tire away from the rim surface of a wheel by moving the bead in a radial outward direction away from the rim surface so as to prevent sliding of the bead across the rim surface and causing possible damage to the rubber in the tire bead.

Still another object of our invention is to provide a novel and improved method of breaking the bead of a tire away from a rim surface.

These and other objects and advantages of our invention will more fully appear from the following description made in connection with the accompanying drawings wherein like reference characters refer to the same or similar parts throughout the several views and in which:

Fig. 1 is a partial top plan view of the bead-breaking apparatus, with the handle structure partly broken away;

Fig. 2 is a side elevation view partly in section of the bead-breaking apparatus with the handle structure broken away and showing the apparatus applied to an automobile wheel; and Fig. 3 is a view similar to Fig. 2 and showing the position of the apparatus at the end of the operation thereof wherein the tire bead has been broken away from the rim surface.

One form of the invention is shown in the drawings and is described herein. The bead breaking apparatus is indicated in general by the numeral 10 and includes a table 11 having rigid post 12 affixed thereto and being of such size as to be adapted to extend through the central opening 13 of an automobile wheel 14 of the type adapted for mounting modern tires 15 which are tubeless and which have a soft rubber portion 16 at the bead thereof which is adapted to rest upon the rim surface 17 of the wheel 14 and be retained against the rim flange 18, as protection against blowouts and the like by means of a bead 19 at the inner edge of the surface 17.

The bead-breaking apparatus also includes a mounting sleeve 20 of such size as to be adapted for sliding along the post 12 and the sleeve 20 has a rigdly affixed outwardly extending arm 21 to which the handle 22 is pivotally attached at 23 for vertical swinging movement. A tire-engaging shoe 24 is positioned in depending relation adjacent the rim flange 18 and has a smoothly rounded lower end portion 24a inwardly toward the rim flange 18 and post 12 and of such a length as to be adapted to lie along the inner surface of the rim flange without engaging the rim surface 17. The shoe 24 is affixed as by welding to one part 25 of a three-part linkage which also includes links 26 and 27. Link 27 is pivotally secured at 28 to the sleeve 20 and is connected by means of a pivot 29 to the link 25. The link 26 is connected by a pivot 30 to the handle 22 and is connected by a pivot 31 to the other end of link 25. The link 27 has an abutment 32 adjacent the pivot 29 for engaging the link 25 and restricting downward swinging of link 25 with respect to link 27 beyond the position shown in Fig. 3. The link 25 is freely swingable in an upward direction with respect to link 27.

In operation, the wheel is applied onto the table 11 over the post 12 and is manually held in an upwardly canted position, and the sleeve 20 is then slipped downwardly along the post with the shoe above the portion of the tire in engagement with the table. When the shoe engages the upwardly facing tire sidewall adjacent the bead, the handle 22 is swung downwardly to the dotted position shown in Fig. 2, whereupon the end portion 24a of the shoe projects inwardly between the tire bead and the rim flange. Additional downward swinging of handle 22 causes downward movement of the shoe 24 in a path of movement about the pivot 28 because the link 25 is restricted in downward movement with respect to the link 27. The rear surface of the shoe 24 engages the tire sidewall and urges the same in a radial outward direction from the cylindrical rim surface 17 and downwardly over the bead 19.

It will be seen that because of the sliding movement of the shoe along the tire sidewall, the pressure is directed in an outward direction away from the surface 17 as well as in a direction therealong. The tire bead and the soft rubber portion is therefore gently lifted off the rim surface and any adhesive relationship between the bead and rim surface is gently broken without causing any damage to the soft rubber 16 or to the surface of the rim flange.

It will, of course, be understood that various changes may be made in the form, detail, arrangement and proportion of the parts without departing from the scope of our invention which consists of the matter described herein and set forth in the appended claims.

What we claim is:

1. In apparatus for breaking the bead of a tire away from the cylindrical rim surface of a wheel, said apparatus comprising a table to support the wheel in canted position thereon and having a post adapted to extend upwardly through the center of the wheel, a mounting sleeve on the post and slidable therealong, a rigid structure affixed on the sleeve and defining a pivot spaced from the post and adjacent the rim flange of the wheel, a vertically swingable handle connected with said pivot, a three-part linkage beneath the handle and said pivot and being swingably connected at its opposite ends with the sleeve and with the handle for vertical swinging movement, the innermost linkage part having means restricting downward swinging of the next adjacent linkage part with respect to said innermost linkage part, a depending shoe rigidly affixed to said next adjacent linkage part and engageable with the tire's upper sidewall adjacent the bead and having a smoothly curved lower end projecting inwardly toward the post to slip beneath the rim flange for engagement with the tire bead, whereby when the tire engages the table at a position beneath the handle and with the portion of the wheel and tire which is diametrically opposite from the portion engaged by the table being canted upwardly, said shoe will bear downwardly and outwardly against said tire sidewall when the handle is swung downwardly to move the bead away, in a radial direction, from the cylindrical rim surface.

2. The invention set forth in claim 1, wherein the curved end of said shoe is substantially shorter than the width of the rim flange whereby to prevent the shoe from engaging the inner surface of the rim well.

References Cited in the file of this patent

UNITED STATES PATENTS

| | | |
|---|---|---|
| 1,475,517 | Snider | Nov. 27, 1923 |
| 1,646,511 | Weaver et al. | Oct. 25, 1927 |
| 2,391,626 | Howard | Dec. 25, 1945 |
| 2,523,979 | Weeks et al. | Sept. 26, 1950 |
| 2,585,628 | Crane | Feb. 12, 1952 |
| 2,873,777 | Thostenson | Feb. 17, 1959 |